United States Patent

Wedam

[15] 3,693,043

[45] Sept. 19, 1972

[54] PULSE REGULATOR CONTROLLED FROM VOLTAGE MULTIPLIER

[72] Inventor: Werner Franz Wedam, Batavia, N.Y.

[73] Assignee: Sylvania Electric Products Inc.

[22] Filed: Oct. 13, 1969

[21] Appl. No.: 865,773

[52] U.S. Cl. ..........................315/29, 315/28, 323/4

[51] Int. Cl. ..........................................H01j 29/70

[58] Field of Search..........315/18, 19, 22, 26, 27, 29; 307/109, 110; 323/4, 7, 9; 321/15

[56] References Cited

UNITED STATES PATENTS

| | | | |
|---|---|---|---|
| 3,533,010 | 10/1970 | Bowles | 321/15 |
| 3,355,639 | 11/1967 | Semenhuk | 323/7 |
| 2,783,412 | 2/1957 | Vonderschmitt | 321/15 |
| 3,513,376 | 5/1970 | Hajek | 321/15 |
| 3,013,197 | 12/1961 | Heightman et al. | 307/110 X |
| 2,807,773 | 9/1957 | Lampe | 323/4 |
| 3,448,371 | 6/1959 | Boymel | 323/4 |
| 2,494,241 | 1/1950 | Haantjes et al. | 315/27 R |
| 2,751,520 | 6/1956 | Nelson | 315/27 R |
| 3,350,599 | 10/1967 | Rickling | 315/22 |
| 3,428,856 | 2/1969 | Jones | 315/22 X |
| 3,467,849 | 9/1969 | Wilson | 307/110 X |

*Primary Examiner*—Benjamin A. Borchelt
*Assistant Examiner*—H. A. Birmiel
*Attorney*—Norman J. O'Malley, Donald R. Castle, Thomas H. Buffton and Edward J. Coleman

[57] ABSTRACT

In a television receiver in which the high voltage power supply for the picture tube includes a voltage multiplier coupled between the retrace pulse output of the horizontal sweep circuit and the second anode of the picture tube, a circuit for automatically regulating the pulse output of said sweep circuit comprising a pulse transformer having a primary winding connected between the multiplier reference terminal and ground, and a rectifier and time delay filter coupled between the pulse transformer secondary winding and the grid bias circuit of the horizontal output amplifier. The pulse transformer develops voltage pulses from the multiplier which, when rectified, provide a control voltage which is a function of picture tube beam current. Application of this control voltage via the filter to the bias circuit is operative to provide the desired pulse regulation by controlling the grid bias of the horizontal output amplifier.

9 Claims, 1 Drawing Figure

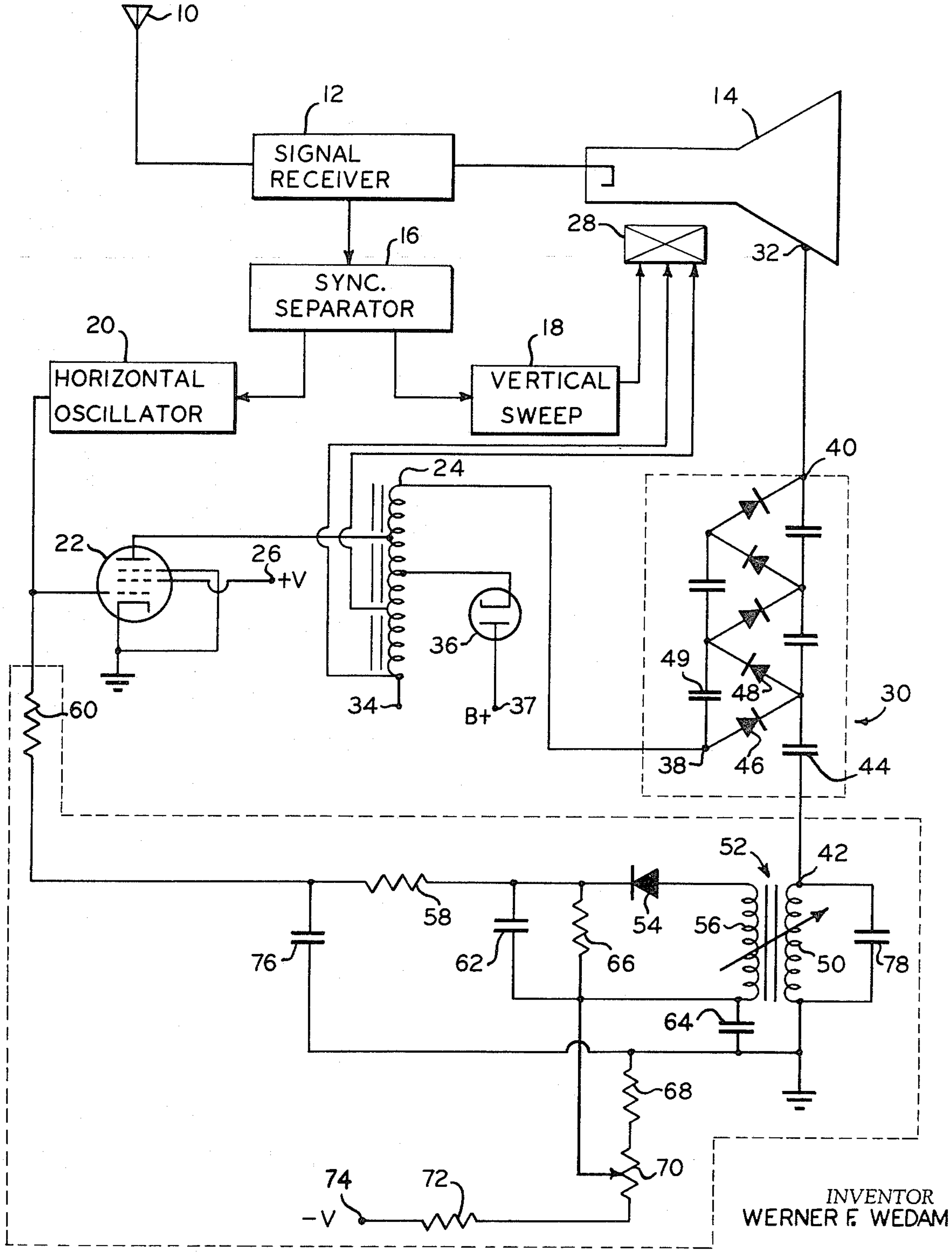
INVENTOR
WERNER F. WEDAM
BY Donald R. Castle
ATTORNEY

PULSE REGULATOR CONTROLLED FROM VOLTAGE MULTIPLIER

BACKGROUND OF THE INVENTION

This invention relates to control circuits for electronic apparatus and, more particularly, to pulse regulator circuits.

An especially useful application of the present invention is for providing automatic pulse regulation of a high voltage power supply in a television receiver. Essentially, there is provided by means of a single feedback circuit, a compromise between ideal pulse width regulation and ideal high voltage regulation.

A prior art approach for providing automatic voltage regulation of the high voltage power supply in a television receiver is to couple a feedback signal from a tap or secondary winding of the horizontal output, or flyback, transformer to a control grid of a horizontal output amplifier for controlling the grid bias of the amplifier. This approach leaves much to be desired, however, in that it is most difficult to tune the flyback transformer for optimum regulation without having deleterious effects on scanning and linearity, especially in view of the production tolerances required for manufacturing television receivers in large quantities.

SUMMARY OF THE INVENTION

Accordingly, it is an object of the present invention to provide an improved control circuit for electrical apparatus.

It is another object of the invention to provide means in combination with a voltage multiplier power supply for deriving a control signal which is a function of load current and applying the control signal to a utilization means.

It is a further object of the invention to provide an improved pulse regulation circuit for the high voltage supply of a television receiver.

Briefly, these and other objects are achieved in combination with a multiplier power supply by an impedance means connected between the multiplier reference terminal and a source of reference potential, and circuit means coupled between the impedance means and a utilization means. In one aspect of the invention, the impedance means comprises the primary winding of a pulse transformer; the utilization means is included in the power supply and comprises an amplifier having a bias circuit; and a rectifier is coupled between the secondary of the pulse transformer and the amplifier bias circuit.

BRIEF DESCRIPTION OF THE DRAWING

This invention will be more fully described hereinafter in conjunction with the accompanying drawing illustrating a television receiver employing a particular embodiment of the invention.

DESCRIPTION OF THE PREFERRED EMBODIMENT

For a better understanding of the present invention, together with other and further objects, advantages and capabilities thereof, reference is made to the following disclosure and appended claims in connection with the above-described drawing.

Referring to the drawing, there appears in block form the well known and conventional elements of a television receiver. These block elements are depicted only for the purpose of more clearly illustrating a particular embodiment of the present invention, which is illustrated schematically. The television receiver shown comprises an antenna 10 for intercepting transmitted television signals and coupling these intercepted signals to a signal receiver 12 including a tuner, an intermediate frequency channel, a sound channel, and a video detector and output amplifier. The video signals available from the output stage of receiver 12 are coupled to the cathode electrode of a cathode ray tube display device 14, more commonly referred to as a picture tube. The detected video signal output of receiver 12 is coupled to a sync separator circuit 16, in which the synchronizing pulses are separated from the video signals and applied to control the vertical sweep circuit 18 and the horizontal scanning frequency oscillator 20. Oscillator 20 provides output pulses at the horizontal scanning rate to drive a horizontal output amplifier 22, which in turn drives a horizontal scanning frequency output transformer 24, generally referred to as a flyback transformer. More specifically, amplifier 22 is a pentode having suppressor and cathode electrodes connected to ground, a screen electrode connected to a source of positive voltage represented by terminal 26, a control grid electrode connected to the output of oscillator 20, and a plate electrode representing the amplifier output terminal and connected to a tap on the horizontal output transformer. Horizontal oscillator 20, output amplifier 22 and transformer 24, of course, comprise the horizontal sweep circuit for the receiver. In response to the synchronizing pulses from circuit 16, both the vertical and horizontal sweep circuits develop potentials suitable for application to electron beam deflection apparatus 28 associated with the picture tube 14. As illustrated, the horizontal deflection potentials are obtained from the tapped primary of output transformer 24.

The high voltage power for the television receiver is obtained from the upper end terminal of the primary winding of output transformer 24 and coupled through a high voltage tripler circuit 30 to the second anode 32 of picture tube 14. The lower end terminal of the transformer 24 primary winding is connected to a source of positive Boost voltage, represented by terminal 34, and the damping function is provided by a diode 36 connected between a tap of the horizontal output transformer and a source of B+ voltage, represented by terminal 37. With respect to the receiver high voltage system, the horizontal sweep circuit functions as a pulsed power supply by providing from the upper end terminal of transformer 24 an output of horizontal retrace pulses, which are rectified and voltage multiplied by the tripler 30 prior to application to second anode 32.

High voltage tripler 30 has an input terminal 38 coupled to the upper end terminal of output transformer 24, an output terminal 40 coupled to the second anode 32 of the display device, and a reference terminal 42 adapted to be coupled to ground. The illustrated tripler circuit is of the conventional type employing two parallel strings of capacitors with crisscross connected diodes arranged to charge and discharge respective capacitors in response to applied input pulses. Of particular interest with respect to the invention, the tripler includes a capacitor 44 having one terminal connected to the reference terminal 42 and the opposite terminal coupled through a plurality of series capacitors to output terminal 40. The tripler further includes a diode 46 connected between input terminal 38 and the output side terminal of capacitor 44 for charging the capacitor, and a diode 48 connected between the output side terminal of capacitor 44 and the output side terminal of a capacitor 49 coupled to input terminal 38 for discharging capacitor 44.

As terminal 42 comprises the ground return of tripler 30, it is normally connected directly to ground. In this instance, however, an automatic high voltage pulse regulator circuit is provided which uses the current pulse through the ground return capacitor 44 of the tripler to generate a correction voltage which is applied to appropriately change the control grid bias of horizontal output amplifier 22. More specifically, the primary winding 50 of a pulse transformer 52 is connected between the tripler reference terminal 42 and ground, whereby the primary winding 50 is in series with capacitor 44. The voltage developed across primary winding 50 in response to pulse driven tripler action is then coupled to the control grid bias circuit of amplifier 22 through the pulse transformer, a rectifier, and a time delay filter circuit. The rectifier comprises a diode 54 having an input anode terminal, which is connected to one end of the secondary winding 56 of pulse transformer 52, and an output cathode terminal coupled through resistors 58 and 60 to the control grid of horizontal output amplifier 22. The rectifier further includes a filter capacitor 62 connected across secondary winding 56. The end of secondary winding 56, opposite that connected to rectifier 54, is coupled to ground through bypass capacitor 64.

The control grid bias of amplifier 22 in the absence of a load is determined by a circuit comprising resistors 58 and 60, a DC coupling resistor 66 connected across secondary winding 56, and a variable resistance circuit comprising fixed resistor 68, potentiometer 70 and fixed resistor 72 serially connected in that order between ground and a source of negative potential represented by the terminal 74. Resistors 60, 58 and 66 are serially connected in that order between the control grid of amplifier 22 and the variable tap of potentiometer 70. Coupled between the output of rectifier 54 and bias circuit resistor 60 is a low pass filter and time delay network comprising the series resistor 58 and a capacitor 76 connected between the junction of resistors 60 and 58 and ground.

In operation, the retrace pulse output of the horizontal sweep circuit output transformer 24 functions as a power supply to drive multiplier 30 and thus provide a high voltage output to a load comprising picture tube 14. The load current flowing through this high voltage system is the electron beam current of the picture tube. Each application of a retrace pulse to the tripler input terminal 38 causes capacitor 44 to charge through diode 46, while the period between pulses permits discharging of that capacitor through diode 48. This charging and discharging of capacitor 44 produces a bipolar pulse voltage waveform across pulse transformer primary winding 50 which has an amplitude directly proportional to the current drawn from the tripler for the normal operating range. More specifically, a capacitor 78 is connected across primary winding 50 to form an LC tuned circuit, the inductance and capacitance of which are selected to resonate at or near a harmonic of the pulse repetition frequency of the horizontal sweep circuit output pulses applied to the tripler. Preferably, this LC circuit is tuned to the third harmonic of the horizontal retrace pulse frequency or higher to provide a lower impedance between capacitor 44 and ground and a higher pulse transformer efficiency. Hence, the insertion of the pulse transformer primary winding circuit in the ground return of the tripler provides means for deriving a signal which is proportional to picture tube beam current. Of course, this function may also be provided by employing an untuned primary or by substituting any other suitable voltage dropping impedance for pulse transformer 52. However, use of a tuned pulse transformer appears to optimize regulator efficiency.

The bipolar pulse waveform developed across primary winding 50 and transformer coupled to the secondary 56 may now be converted to a positive or negative DC feedback voltage by use of an appropriate half-wave rectifier. In the drawing, rectifier diode 54 is oriented to provide a positive DC voltage signal, which is filtered by the circuitry comprising capacitor 62, resistor 58 and capacitor 76. In this manner, a positive feedback voltage is added to the initially established negative bias voltage coupled from terminal 74 to control the grid bias of output amplifier 22 via bias resistor 60. As the voltage amplitude of the pulse output of transformer 24 increases, thus causing an increase in picture tube beam current, positive feedback voltage from the regulator circuit will increase correspondingly to reduce (make less negative) the negative bias on the control grid of amplifier 22 and thereby regulate the pulse output at the plate electrode thereof to decrease the output voltage from transformer 24 and the beam current level. Conversely, as the sweep circuit voltage and beam current decrease, the regulator feedback voltage will become less positive to permit application of a more negative control grid bias to the horizontal output amplifier so as to increase the high voltage output and beam current flow.

A particular advantage of the present invention is the fact that the regulator circuit may be readily adjusted for optimum operation independent of the horizontal sweep circuitry. As previously mentioned, potentiometer 70 provides means for initially adjusting the amount of negative bias applied to the control grid of amplifier 22 in the absence of beam current flow. The amount of regulation provided when beam current is flowing through picture tube 14 is then established by adjusting the coupling of the pulse transformer windings. More specifically, the amount of positive feedback voltage under load conditions is adjusted by means of a variable core in the pulse transformer 52 to provide a control grid bias for amplifier 22 which will regulate the pulse output thereof to maintain a selected beam current level. The sensitivity of pulse regulation is determined by appropriate selection of the filter circuit components comprising resistor 58 and capacitors 62 and 76 to provide a desired time delay in the application of the positive feedback control signal through bias resistor 60 to the control grid of amplifier 22. Accordingly, the described circuitry within the dashed line block at the bottom of the drawing provides automatic means for deriving a control signal which is a function of picture tube beam current and applying that signal to control the grid bias of the horizontal output amplifier and, thus, provide pulse regulation for the high voltage system of the television receiver. Deriving the pulse regulator control signal from the voltage tripler 30 permits ease of adjustment for optimum operation and avoids the need for critical tuning of the horizontal output transformer.

It is to be understood that the invention is not limited to use in television receivers having cathode ray tube display devices, but may be employed in other types of electrical apparatus having an alternating current (AC) or pulsed power supply, voltage multiplier, and load. Further, the derived control signal may be applied to other types of utilization means than the horizontal output amplifier which perform functions other than pulse regulation. As for the control circuit structure, some applications may require coupling of the bipolar pulse output of the pulse transformer to provide an AC control signal for a utilization means. Hence, although the invention has been described with respect to certain specific embodiments, it will be appreciated that modifications and changes may be made by those skilled in the art without departing from the true spirit and scope of the invention.

What is claimed is:

1. In electrical apparatus including an AC or pulsed power supply, a load, and a voltage multiplier coupled between said power supply and said load and having a reference terminal adapted to be coupled to a source of reference potential, control means for deriving a control signal which is a function of the current in said load and applying said control signal to said power supply comprising: an impedance comprising a primary winding of a pulse transformer connected between the reference terminal of said multiplier and said source of reference potential, and circuit means including a rectifier having an input coupled to a secondary winding of said pulse transformer and an output coupled to said power supply, said control signal being a DC voltage available at the output of said rectifier.

2. The control means of claim 1 wherein said multiplier includes a capacitor having a first terminal connected to the reference terminal of said multiplier and a second terminal coupled through circuit means to the output terminal of said multiplier, a first diode connected between the input terminal of said multiplier and the second terminal of said capacitor for charging said capacitor, and a second diode connected between the second terminal of said capacitor and circuit means coupled to the input terminal of said multiplier for discharging said capacitor.

3. The control means of claim 1 wherein said power supply includes an amplifier having a bias circuit coupled to the output of said rectifier.

4. The control means of claim 1 wherein a filter circuit is coupled between the output of said rectifier and said power supply.

5. The control means of claim 1 wherein the primary winding of said pulse transformer is included in a circuit tuned to a harmonic of the repetition frequency of the pulse output of said power supply.

6. The control means of claim 1 wherein said pulse transformer has a variable core for adjusting the amount of control signal applied to said power supply when current is flowing through said load.

7. The control means of claim 3 wherein said bias circuit includes a potentiometer for adjusting the amount of bias applied to the control electrode of said amplifier in the absence of load current.

8. The control means of claim 3 wherein said power supply further includes a pulse source, said amplifier has a control electrode coupled to said pulse source and an output electrode coupled to said multiplier, said bias circuit is connected to the control electrode of said amplifier, and application of said control voltage to said bias circuit is operative to regulate the pulse output of said power supply.

9. The control means of claim 8 wherein said electrical apparatus is a television receiver, said load comprises an electron beam display device having a plurality of electrodes with a signal source being coupled to at least a first one of said electrodes, said pulse source comprises a horizontal scanning frequency oscillator coupled to said signal source for synchronization, said power supply further includes a horizontal scanning frequency output transformer having a first terminal coupled to the output electrode of said amplifier, said multiplier has an input terminal coupled to a second terminal of said horizontal output transformer and an output terminal coupled to a second one of the electrodes said display device, and said control voltage is a function of the beam current of said display device.

* * * * *